(12) United States Patent
Toynbee

(10) Patent No.: US 9,261,195 B2
(45) Date of Patent: Feb. 16, 2016

(54) ENERGISED SEAL

(75) Inventor: John Toynbee, Woking (GB)

(73) Assignee: James Walker & Co. Ltd., Woking, Surrey (GB)

( * ) Notice: Subject to any disclaimer, the term of this patent is extended or adjusted under 35 U.S.C. 154(b) by 367 days.

(21) Appl. No.: 13/120,198

(22) PCT Filed: Sep. 24, 2009

(86) PCT No.: PCT/GB2009/051253
§ 371 (c)(1),
(2), (4) Date: Jun. 9, 2011

(87) PCT Pub. No.: WO2010/035039
PCT Pub. Date: Apr. 1, 2010

(65) Prior Publication Data
US 2011/0227291 A1    Sep. 22, 2011

(30) Foreign Application Priority Data
Sep. 24, 2008 (GB) .................................. 0817532.5

(51) Int. Cl.
*F16J 15/00* (2006.01)
*F16J 15/32* (2006.01)

(52) U.S. Cl.
CPC .................................. *F16J 15/3268* (2013.01)

(58) Field of Classification Search
USPC .................. 277/500, 589, 604, 609, 616, 624
See application file for complete search history.

(56) References Cited

U.S. PATENT DOCUMENTS

| | | | | |
|---|---|---|---|---|
| 2,983,529 A * | 5/1961 | Price | ............................. | 277/346 |
| 4,280,741 A * | 7/1981 | Stoll | ............................... | 384/16 |
| 5,118,206 A * | 6/1992 | Otto et al. | ..................... | 384/477 |
| 5,149,107 A * | 9/1992 | Maringer et al. | ............. | 277/556 |
| 5,172,921 A * | 12/1992 | Stenlund | ........................ | 277/300 |
| 5,183,271 A * | 2/1993 | Wada et al. | .................... | 277/351 |
| 5,245,741 A | 9/1993 | Smith et al. | | |
| 5,303,935 A | 4/1994 | Saksun | | |
| 5,380,015 A * | 1/1995 | Laflin et al. | .................... | 277/570 |
| 5,897,119 A * | 4/1999 | McMillen | ..................... | 277/562 |
| 6,007,070 A | 12/1999 | Heathcott et al. | | |
| 6,450,502 B1 | 9/2002 | Baehl et al. | | |
| 7,182,372 B2 * | 2/2007 | Wolff | ............................. | 285/374 |
| 7,827,665 B2 * | 11/2010 | Happel et al. | .............. | 29/402.02 |
| 8,028,998 B2 * | 10/2011 | Schleker et al. | .............. | 277/551 |
| 8,210,543 B2 * | 7/2012 | Erl et al. | ........................ | 277/585 |
| 8,215,646 B2 * | 7/2012 | Castleman et al. | ........... | 277/552 |
| 2004/0100038 A1 | 5/2004 | Proper | | |
| 2006/0022414 A1 | 2/2006 | Balsells | | |
| 2009/0051125 A1 * | 2/2009 | Skinner | ........................ | 277/609 |

FOREIGN PATENT DOCUMENTS

EP    0490204 A1    6/1992
JP    11-344121 A   5/1998

* cited by examiner

*Primary Examiner* — Kristina Fulton
*Assistant Examiner* — Eugene G Byrd
(74) *Attorney, Agent, or Firm* — Hodgson Russ LLP

(57) ABSTRACT

A seal assembly (1) described comprises an elastomeric component (10) having a sealing surface (25) for providing a sealing function, and an energizing band (30), the elastomeric component (10) including an aperture for the energizing band, wherein the energizing band is adapted to fit in the aperture of the elastomeric component (10). In use, an outer surface of the energizing band applies a force to the elastomeric component (10), to deform the (10) elastomeric component to form a seal at the sealing surface. The energizing band (30) component includes non-metallic material.

12 Claims, 2 Drawing Sheets

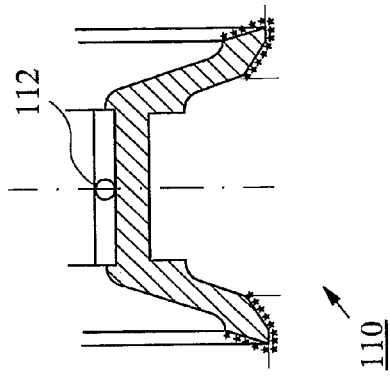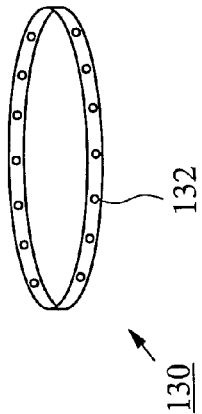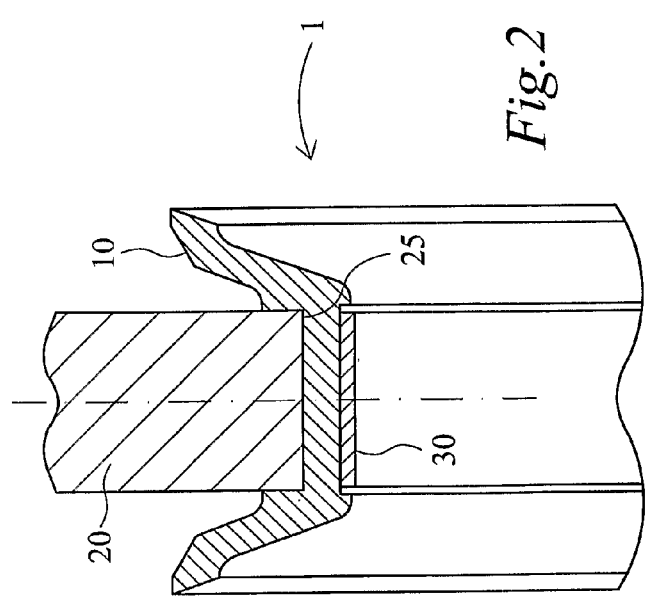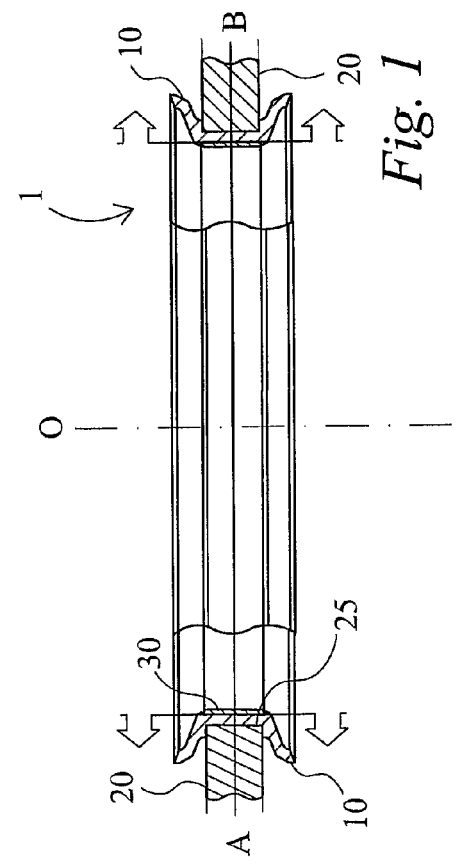

ENERGISED SEAL

Figure 5:
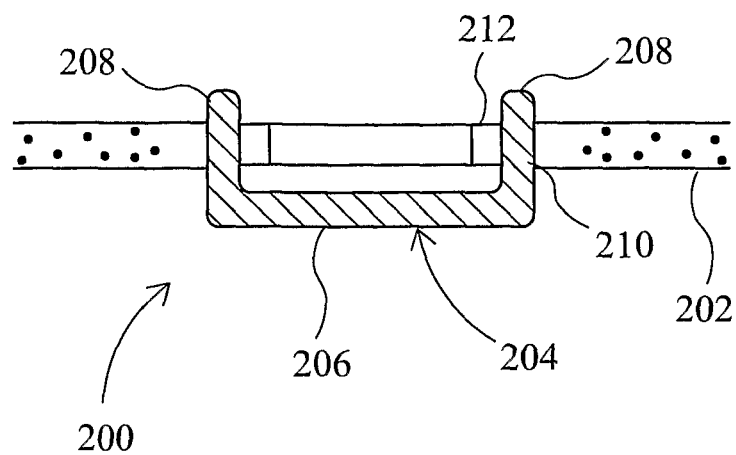

This invention relates to seals and in particular to elastomeric seals. Aspects of the invention find particular application to energised seals and to methods of manufacture of energised seals.

Where reference is made herein to energised seals, preferably the seal comprises a sealing member including an elastomeric component and further includes an energising member. For example, the sealing member includes an aperture, and in use the energising member is in the form of an energising band or ring located in the aperture and arranged to apply an energising force to the sealing member to cause the elastomeric component to provide the desired sealing function.

For example, the energising ring may be arranged in use in the aperture and be dimensioned such that it applies an energising force in the elastomeric component to effect the desired sealing function.

An example of an application for such energised seals is in relation to No-Twist Rod Mill Seals (NTRMS). NTRMS are used in metal rolling apparatus. For example they may be located such as to protect the mill bearings. As such, the seal may be exposed to the milling environment itself as well as, for example lubricant, and/or steam. In some cases, the seals will be required to be suitable for use in harsh chemical and/or physical environments. In many cases, such seals are required to be suitable for use in elevated temperature environments, for example at 200 degrees C. or more.

A sectional view of a part of a known energised seal arrangement is shown in FIG. 1. The seal 1 shown in FIG. 1 is generally annular and comprises two components: a sealing member comprising an elastomeric component 10, and a metal energising band or ring 30. As shown in FIG. 1 the annular elastomeric component 10 may be fitted in use within the inner circumference of a housing 20. An energising band 30 is fitted within an inner circumference of the elastomeric component 10 to form a coaxial inner sleeve in the elastomeric component 10. The energising band 30 is dimensioned to apply a radial force to the elastomeric component to urge the elastomeric component 10 against the housing 20 to perform the sealing function.

In the arrangement shown in FIG. 1, the energising band 30 has an outer diameter which is larger than the inner diameter of the inner circumference of the elastomeric component 10, so that when the band 30 is fitted to the elastomeric component 10, the band 30 exerts a radial force and/or hoop stress on the elastomeric component 10. This acts to elastically deform or energise the sealing member, causing elastomeric component 10 to press against the housing 20 thereby the sealing function to be performed.

In known arrangements, the energising band is made from stainless steel. The energising band or ring 30 is fabricated from a strip of steel which is pressed into the required shape and then either overlap- or butt-welded to join portions of the steel band to form the energising ring of the required external circumference.

However, there are disadvantages with such an arrangement.

Firstly, it has been found that the shape of the energising band 30 is of importance for obtaining the desired sealing function, but that the fabrication of the band to the required shape and configuration within the desired tolerances can be difficult. For example, the welding process used in its manufacture can lead to the metal energising band being skewed and/or non-circular. This can result in an inconsistent sealing load being applied to the elastomeric component, which may result in a reduced lifetime of the seal. In addition, the use of welding to form the band can form a band 30 having a non-circular outer surface, in particular where overlap welding is carried out. This may lead to reduced sealing performance and/or reduced life of the seal.

A further difficulty encountered with the known steel energising bands is that the energising band can be difficult to fit into the aperture of the sealing member. In particular, fitting the metal energising band within the aperture in the seal is challenging because the outer circumference of the band is larger than the inner circumference of the aperture in the sealing member, and in some cases, the band cannot be deformed elastically and the band can be damaged during insertion. Furthermore, insertion of the band generally requires the input of skilled fitters and specialist dedicated tooling. This adds cost to the installation of the seal. In addition, failure to fit the band in the seal correctly can result in damage to the sealing member, which in turn can result in premature seal failure.

This invention therefore seeks to provide a sealing arrangement which overcomes or mitigates one or more of the problems described above and/or other problems.

According to a first aspect of the invention, there is provided an energising band for use in an elastomeric seal assembly comprising a sealing member including an elastomeric component having a sealing surface for providing a sealing function and including an aperture for the energising band, wherein the energising band is adapted to fit at least partly in the aperture of the sealing member such that, in use, an outer surface of the energising band applies a sealing force to the elastomeric component; and wherein the energising band component comprises substantially non-metallic material, and/or a plastics material Preferably the band includes one or more plastics materials. Preferably the band comprises an engineering plastics material. Preferably the material of the energising band includes at least 80%, preferably 90% by weight of plastics material. In some arrangements, it is preferred for the band to comprise substantially only plastics material, for example only engineering plastics material.

The use of a non-metal material in the energising band, for example one made of a plastics material, for example including an engineering plastics material, can give rise to advantages over stainless steel bands. For example, the dimensional accuracy of the energising bands can be improved. For example, the bands may be formed by moulding, or machining, techniques, which may give rise to more uniform shape and/or configuration of the bands compared with steel bands. The shape disadvantages discussed above associated with the welding of steel bands can also be reduced or avoided. In addition, the cost of manufacture of large numbers of the bands can be low. Also, the ease of fitting of the band according to the present invention can be improved as discussed further below.

While an example of a type of seal and band arrangement is shown in FIG. 1, it should be understood that features of the invention can be applied to many types of seal. The invention is not to be considered restricted particularly to the arrangement shown in the FIG. 1 or any of the other figures. Preferably, the invention has general application to all energised seals.

A broad aspect of the invention provides an energising band for an energised seal, the band including plastics material, preferably engineering plastics material.

The band may comprise a single material, or may comprise more than one material, which may be present as a mixture or blend of materials, and/or which may be present as layers or different regions of the band. The band may include one or more coatings on all or only a part or region of the band. One or more of the layers or coatings may comprise plastics material, or other material. One or more of the materials in the band, for example one or more of the layers or coating may comprise a metal or metallic material.

The band may be substantially circular. Preferably the band is annular, preferably the outer surface of the band is substantially circular. The inner surface may also be generally circular. Surface formations may be provided as discussed further below.

Preferably the size of the band is larger than the size of the aperture.

The aperture may be generally circular and the outer diameter of the band is preferably larger than the inner diameter of the aperture of the sealing member. The aperture may be formed in the elastomeric component.

In some examples, the outer diameter of the band is at least 0.25 mm larger, preferably at least 0.5 mm larger than the inner diameter of the aperture. In some applications, the outer diameter of the band may be as much as 1 or 2 mm larger or more than the inner diameter of the aperture. In one example, a seal having a 145.07 mm inner diameter is used with a band having an external diameter of 145.85 mm. Preferably the outer diameter of the band is about 0.25% greater than the corresponding diameter of the aperture, for example between about 0.5 and 1.0% greater than the corresponding diameter of the aperture. Generally, preferably a dimension of the band is between about 0.5% and 1.0% greater than the corresponding dimension of the aperture.

The sealing member and/or elastomeric component may include a section which is generally annular. Thus in some arrangements, the aperture of the sealing member may be provided by the interior surface of the generally annular section.

The elastomeric component may be substantially annular. The sealing member itself may be substantially annular in shape.

Preferably, the amount by which the outer dimensions of the energising band are larger than the inner dimensions of the aperture of the sealing member is such that the sealing force exerted on the elastomer is sufficient to cause a seal to be formed at the sealing surface against a sealing seat, and to prevent rotation of the seal in the application.

Preferably, for an elastomeric component of thickness in the range 5 mm to 10 mm, with an inner diameter of about 110 mm, the thickness of the energising band is in the range of about 5 mm to 10 mm, for example about 7 mm. Bands up to 200 mm diameter or even more are envisaged.

Preferably, the energising band is both chemically and temperature resistant under environmental operating conditions to be experienced by the seal. For example, operating conditions may include temperatures of 130° C. to 200° C. or more, and exposure to steam, machinery lubricating oils and/or other chemicals depending on the intended use of the seal. Preferably the seal material is resistant to alkali, amines, and any other corrosion inhibitors that may be present in the hydraulic oil used, including those commonly present in such systems. The energising band may also be exposed to hydraulic fluids and cooling water at elevated temperatures.

Preferably, the energising band material exhibits a change in volume of no more than about 10%, preferably no more than about 5% across the operating temperature range and/or in exposure to the chemical environment. Preferably the change in elastic modulus of the material and/or other physical property is no more than about 10%, preferably no more than about 5% in exposure to the relevant environmental factors. Preferably the Tg of the material of the band is greater than 100 degrees C., preferably greater than about 150 degrees C., preferably greater than 200 or 250 degrees C.

The energising band may include one or more polymer materials. For example, the energising band may comprise PEEK (polyether etherketone) or polyoxymethylene (polyacetal). The band may include one or more aromatic polyethers, for example PPO polyphenylene oxide, which is resistant to aqueous acids and alkalis and has good dimensional stability. Polyphenylene sulphide (PPS) may be included in the band material, being chemically resistant with good thermal stability. Aromatic polysulphones might also be used. The band may include polyphenyl sulphone (PPSU). The material of the band may include a polyamide, for example a nylon polymer or copolymer. For example the material may include nylon 6, 6 or nylon 6, 10. The material of the band may include a polyimide or polyamide-imide (PAI) or similar. The material may include one or more polymers or copolymers.

The energising band may include any appropriate material, optionally including fillers and other components such that the band has the required physical and chemical properties.

The material of the energising band may contain fillers, for example glass fibre, carbon fibre and/or graphite. Preferably the material includes not more than 75% by weight of filler components based on the weight of the band material. The band material may include less than 50%, 30%, or even less than 10% by weight of filler components based on the weight of the material, depending on the polymer materials used and the intended application of the material.

Preferably, the energising band is manufactured by machining or moulding, although any appropriate technique could be used. Energising bands in some examples of the invention can provide several advantages over a band comprising a welded stainless steel strip, for example:

uniformity—where the material of the band is not welded, each individual band can be made having a more uniform outer surface than previously; a uniform energising band being desirable as it can exert a uniform energising force on the sealing member in some arrangements accuracy—machining and moulding can be a more accurate manufacturing processes than welding, and therefore the band can be manufactured within more demanding manufacturing tolerances than previously for some examples;

ease of installation. Preferably the band is sufficiently flexible so that it can be deformed for installation in the elastomeric component, but sufficiently stiff so that it provides the necessary hoop stress to provide the sealing effect. In some cases the use of a specialised tool will not be necessary for installing the band.

These advantages can provide for more reliable, longer-lived seals with more predictable behaviour (for example, in terms of peak sealing pressure and time-to-failure).

It should be understood that not all of the examples of the band in accordance with the invention will have some or all of these advantages. It is envisaged that bands in accordance with the invention might be formed using a welding operation. Such bands may still have one or more of the advantages indicated above and/or other advantages.

In some examples, the energising band has a rectangular profile. Alternatively, the profile of the energising band may be a different shape, for example circular, lenticular, D-shaped or any other appropriate shape.

The energising band may be manufactured to include further features not previously available with fabricated metal bands.

Preferably the band is sufficiently stiff that it can resist deformation when installed in the seal assembly. However, preferably the band on installation in the seal assembly is sufficiently flexible that it can be deformed during installation. The required flexibility/stiffness may be an inherent property of the band material, for example the plastics material formulation, and/or the band itself, for example in relation to its dimensions, for example the sectional shape of the band and/or its thickness, and/or stiffness may be provided by stiffening members.

The band may further include stiffening members. Preferably the stiffening members are provided on an inner surface of the band.

For example, the stiffening members may act to increase the stiffness of the band. The strength members may be formed during the forming of the energising band itself or alternatively or in addition they may be added at a later time. These members may have any of various geometries.

Preferably, the strength members are located on an inner surface of the energising band. Alternatively, or in addition, strength members may be located on the outer surface of the energising band.

The band may further include engagement formations for engagement with the sealing member. For example, the sealing member/elastomeric component and the band may include complementary formations. This can improve the attachment of the band to the relevant portion of the sealing member.

The band may include one or more recesses or apertures for engagement with protrusions on the sealing component. For example, the band may include holes around its circumference, the elastomeric component including buttons of elastomeric material which extend into the holes, thus improving bonding of the material to the band and to further reduce the ability to rotate. In some examples, the elastomeric material may be formed onto the band by moulding, the buttons extending into the holes or other formations in the band during the moulding process.

This feature is of particular importance in some arrangements and may be provided independently, for example as discussed further below.

In other arrangements, where the protrusions are preformed on the elastomeric component, these engagement means can assist in alignment when fitting the energising band to the elastomeric component and also to reduce slippage of the energising band relative to the elastomeric component once the energising band is in place.

In some examples, engagement means comprise formations adapted to increase friction between the energising band and the elastomeric component. In some examples, the strength members may also act as engagement members.

In another example, first engagement means on the band are adapted to engage with second engagement means located on the inner surface of the elastomeric component. Preferably, said first engagement means comprise a plurality of indentations, preferably holes. Preferably, said second engagement means comprise a plurality of protrusions. More preferably, said protrusions comprise moulded buttons. In an alternative, said first engagement means comprise protrusions and said second engagement means comprise indentations. Thus it will be appreciated that the band may include protrusions, the elastomeric component including recesses or holes.

According to another aspect of the invention there is provided an energising band for use in an elastomeric seal assembly comprising a sealing member including an elastomeric component having a sealing surface, the energising band being generally annular and adapted to fit substantially within the sealing member, and having an outer diameter larger than an inner diameter of the sealing member, such that, in use, an outer surface of the energising band applies a radial force to an inner surface of the sealing member, thereby applying a sealing force to the elastomeric component; and wherein said energising band further comprises an engagement formation located at an outer surface of the energising band and adapted to engage with the sealing member.

According to this aspect, the band may or may not include metallic material.

The engagement formation may for example include one or more holes or recesses for example for engagement with protrusions on the sealing member and/or one or more protrusions for example for engagement with holes or recesses in the sealing member.

A portion of the elastomeric component may be in interlocking engagement with a portion of the band. In some arrangements, the elastomeric component and band may be moulded together to form a single component. This may give rise to significant advantages when fitting the seal.

A bonding agent, for example a chemical bonding agent may be provided between a surface of the band and a surface of the elastomeric component.

According to another aspect of the invention there is provided a seal arrangement including a band as described herein and the sealing member.

According to a further aspect of the invention, there is provided a seal assembly comprising a sealing member including an elastomeric component having a sealing surface for providing a sealing function, and an energising band, the sealing member including an aperture for the energising band, wherein the energising band is adapted to fit in the aperture of the sealing member such that, in use, an outer surface of the energising band applies a sealing force to the elastomeric component, and wherein the energising band comprises substantially non-metallic material.

The invention also provides a seal assembly as described herein, wherein the band is generally annular and has an outer diameter larger than an inner dimension of the sealing member, such that, in use, the outer surface of the energising band applies a sealing force to an inner surface of the elastomeric component.

Also provided by an aspect of the invention is a seal assembly comprising:
a sealing member having an elastomeric component having a sealing surface, and an inner opening,
an energising band fitted into the inner opening, and
the energising band comprising non-metallic material.

A further aspect of the invention provides a seal assembly comprising an elastomeric component having a sealing surface for providing a sealing function, and an energising band for applying a sealing force to the elastomeric component, wherein the elastomeric component is applied to the band by moulding.

Moulding the elastomeric component, for example elastomeric material of the elastomeric component onto the band, for example of plastics material, can give rise to particularly advantageous seals in some arrangements. In particular, in some cases, significantly improved bonding can be obtained between the elastomeric component and the band.

Preferably the band comprises a plastics material. This can give better bonding compared with non-plastics materials. The band may include one or more materials, one or more of which might be plastics materials.

Preferably the band comprises surface formations in an interface region between the elastomeric component and the band. Such surface formations can improve the bonding still further between the elastomeric component and the band. For example, the surface formations may comprise projections and/or recesses in the surface of the band, for example providing a keyed surface for the elastomeric material.

In some examples, the band may comprise recesses and/or apertures in its surface. For example, the band may comprise perforations for example around its circumference. The elastomeric material may flow into such formations during moulding thus improving bonding between the components.

The seal of the present aspect may further include one or more of the features indicated herein in relation to other aspects of the invention.

The invention further includes a method of manufacture of an energised seal comprising an elastomeric component having a sealing surface for providing a sealing function, and an energising band for applying a sealing force to the elastomeric component, wherein the method includes the step of moulding the elastomeric component onto one or more surfaces of the band.

Preferably the band includes one or more surface formations and the moulding step includes moulding elastomeric material onto the band so that the material keys with the surface formations.

Preferably the band includes one or more perforations, the method including moulding the elastomeric material onto the band so that it flows into the perforations.

As an alternative, or in addition, chemical methods, for example chemical bonding agents or etching methods could be used to bond the rubber chemically to the plastic. For example an adhesive composition could be applied between the elastomeric material and the band. Any suitable composition could be used. Thus the method may further include the step of applying a bonding agent between at least a portion of the band and at least a portion of the elastomeric material.

The moulding may be carried out by any appropriate method, for example by injection moulding, transfer moulding or compression moulding. In many cases, control of the dimensions of the components, for example selection of an appropriate outer diameter of the band, and hoop strength are important in obtaining the desired energising of the seal. In many cases, simply by obtaining the appropriate dimensions of the band, the energising will occur.

In some cases, it may be possible to form the energised seal and band in one piece. For example, a two-step moulding technique may be used to form the seal. In such a method, a first step may comprise moulding the band to have the desired dimensions; in the second step, the correct amount of elastomer would be injection moulded into a mould containing the band to form the energised seal in one piece. Such a method, or other method to produce a one-piece seal may give rise to advantages in installing the seal. The band and elastomeric material may be moulded together to form a single element.

As used herein, the terms "band" and "ring" when referring to the elastomeric seal or the energising band are preferably to be understood as being interchangeable, where appropriate. It is, however, to be understood that the shape of the band is not necessarily circular as shown in the examples; other configurations of the aperture and band are possible.

The invention extends to methods and/or apparatus substantially as herein described, preferably with reference to one or more of the accompanying drawings.

Any feature in one aspect of the invention may be applied to other aspects of the invention, in any appropriate combination. Apparatus features may be applied to method aspects, and vice versa.

Figure 6:
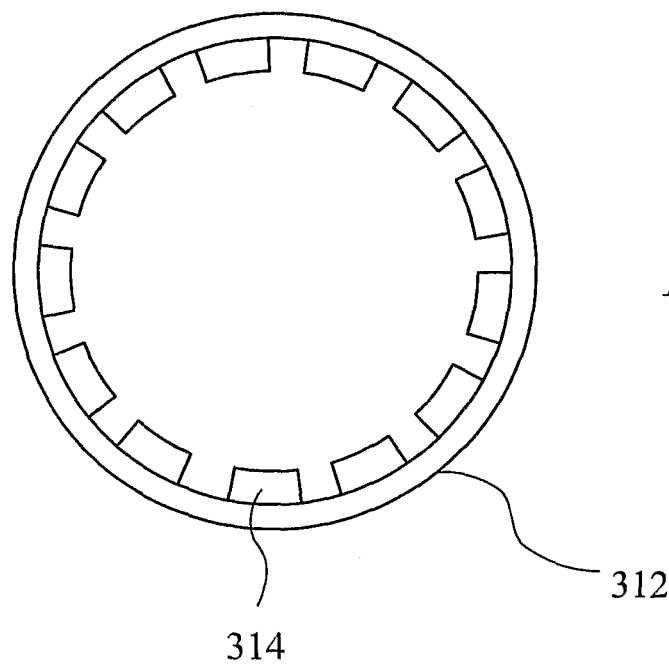

Preferred features of the present invention will now be described, purely byway of example, with reference to the accompanying drawings, in which:

FIG. 1 shows a cross-sectional view of a seal assembly;
FIG. 2 shows a part of the view of FIG. 1 in more detail;
FIG. 3 shows another example of an energising band;
FIG. 4 shows a sectional view a seal assembly including the band of FIG. 3;
FIG. 5 shows a further example of a seal arrangement; and
FIG. 6 shows a further example of an energising ring.

FIG. 1 shows an elastomeric seal assembly 1, comprising a sealing member including an annular elastomeric component 10 fitted within the inner circumference of a housing 20, and held in place against a sealing surface 25 by an energising band 30 fitted within the inner circumference of the elastomeric component 10. The energising band 30 acts with a sealing force to press the elastomer against the sealing surfaces 25 of the housing 20 to perform the sealing function.

The energising band 30 has an outer diameter which is larger than the inner diameter of the elastomeric component 10, so that when the band 30 is fitted to the elastomeric component 10, by being inserted to form a co-axial inner sleeve, the band 30 exerts a radial force on the elastomeric component 10. This acts to elastically deform or energise the elastomer, causing it to be urged against the housing 20 thereby retaining the elastomeric component 10 in place and enabling a sealing function to be obtained.

FIG. 2 is a cross-sectional view of a part of seal assembly 1 of FIG. 1. The shape of elastomeric component 10 can be seen to be such as to fit closely against the sealing seat of the housing 20, with energising band 30 engaging the elastomeric component 10.

The choice of materials for the elastomeric component 10 and energising band 30 will depend on the expected operating conditions and the sealing performance required, and the mechanical properties at operating temperatures. Generally, the materials are required to be heat and chemical resistant. Operating temperatures may be for example between about 130 and 200 degrees C., with resistance to steam, lubricating fluids being required. Preferably, where appropriate, the sealing member and/or elastomeric component has one or more of the chemical resistance properties and/or physical properties (for example temperature resistance) of the band discussed herein. The hardness of the elastomeric component may be for example between 70 and 90 IRHD (International Rubber Hardness Degrees). The elastomeric component may include any appropriate elastomer, for example natural rubber, butyl rubber, polybutadiene, styrene-butadiene elastomer (SBR), nitrile rubber, hydrogenated nitrile rubber (HNBR), or for example EPM (ethylene propylene elastomer), ethylene propylene diene rubber (EPDM) a fluorine-containing elastomer, for example a fluoro- or perfluoro-elastomer FKM or FFKM or any other appropriate elastomer or mixture or blend of elastomers.

Preferably the material of the seal is chosen to as to be resistant to impact of particles and other debris which may be within the operating environment.

The following is an example of environmental factors for application of a seal arrangement for use in a No Twist Rod Mill. It will be appreciated that the seals of the present invention are not restricted to those for use in the particular applications described. The following list is intended to give an indication of the physical and chemical environment to which the seal might be exposed.

Example of temperature/chemical environment:
Line speed of 120 m/s (up to at least 150 m/s)
Oil temperature of up to 100 degrees C., localised temperatures in excess of 150 degrees C., may be as high as 200 degrees C.
Water and steam exposure, lubricating oil exposure (generally mineral based, but other oils may be used)
Debris from the process In this example, the seals are for use in protecting the bearings in high-speed rolling mills for manufacturing steel rod, and are known in the art as Non-Twist Roll Mill Seals (NTRMS). The elastomeric component 10 is made of HNBR (or any other appropriate material), and the energising band 30 is machined or moulded of PEEK (polyether etherketone): an engineering plastic.

The assembly of the elastomeric seal assembly 1 involves the successive deformation and insertion of firstly, the elastomeric component 10 into the housing 20, and subsequently, the deformation and insertion of the energising band 30. The engineering plastic material of the energising band 30 is relatively easy to deform without requiring specialist tools for its insertion, but is suitably engineered when installed to provide the necessary sealing function.

FIG. 4 shows an energising band 130 which is similar to the energising band 30 described except it includes holes 132 arranged around its circumference. The elastomeric component 110 shown in FIG. 4 is moulded directly onto the band 130. As shown in FIG. 4, elastomeric material extends into the hole 132 forming a button 112 which holds the band in place.

FIG. 5 shows an alternative example of a seal arrangement. The arrangement 200 includes a housing 202 and a cup-shaped elastomeric sealing component 204 located within an aperture in the housing. The sealing component 204 has a base 206 and upstanding walls 208. The region of the walls 208 adjacent the housing 202 include sealing surfaces 210. While a particular shape has been shown in FIG. 5, it will be understood that the seal could have any shape, so long as it provides sealing surfaces against sealing seats of the housing. Where reference is made to "base" and "upstanding", it will be understood that the arrangement may be in a different orientation.

An energising ring 212 is located between the walls 208. The outer dimension of the ring 212 is larger than the corresponding dimension between the walls 208 so that the ring exerts an outwards force on the elastomeric component thus providing sealing of the walls 208 against the sealing seats 210.

The material of the ring and/or the elastomeric component may be as described above. The sealing member may consist of the elastomeric component.

FIG. 6 shows a further example of an energising ring 312 which can be used for any appropriate seal arrangement. It will be seen that the ring 312 is generally circular and around its internal circumferential surface there is arranged a plurality of stiffening formations 314. In this case, the formations provide teeth which extend generally radially inwards from the internal surface. It will be appreciated that other shapes of formation 314 could be used and they could be arranged differently around the internal surface of the ring 312. The ring 312 may also include the holes 132 of the ring of FIG. 3 and/or other formations associated with the outer surface of the ring for engagement with the sealing member.

As indicated above, the elastomer and ring may be formed in one piece. The elastomer and ring may be formed by moulding by any appropriate method, for example as indicated above. In some cases, a two-step moulding technique may be used, for example as described above.

In a further example of a two-step moulding method, the elastomer may be moulded onto a hot plastic component to form the seal assembly. The elastomer may be moulded onto the band component. In such cases etching or bonding agents and/or formations such as holes or perforations in the band may or may not be used. The elastomer may adhere to the ring without such further elements being required, for example if the ring is at a high temperature.

It will be appreciated by those skilled in the art that appropriate elastomers for the seal component and suitable materials for the energising ring will be chosen according to the operating conditions.

The components and features shown in the attached drawings are not necessarily shown to scale.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A seal assembly comprising an elastomeric component having a sealing surface for providing a sealing function, and an energising band, the elastomeric component including an aperture for the energising band having an inner diameter; wherein the aperture of the elastomeric component is generally circular and an outer diameter of the energising band is larger than the inner diameter of the aperture of the elastomeric component; wherein the outer diameter of the energising band is adapted to coaxially against the inner diameter of the aperture of the elastomeric component such that, in use, the energising band applies a sealing force to the inner diameter of the elastomeric component; wherein the energising band component includes substantially non-metallic material; wherein the material of the energising band includes one or more of polyoxymethylene, aromatic polyether, polyphenylene sulphide, aromatic polysulphone, polyphenyl sulphone, polyamide, polyimide or polyamide-imide; and wherein the energising band is flexible.

2. A seal assembly according to claim 1, wherein the elastomeric component includes a section which is generally annular.

3. A seal assembly according to claim 2, wherein the elastomeric component is substantially annular.

4. A seal assembly according to claim 1, wherein the material of the band includes not more than 75% by weight of filler components based on the weight of the material.

5. A seal assembly according to claim 1, wherein the band is manufactured by machining and/or moulding.

6. A seal assembly according to claim 1, wherein the band further includes one or more stiffening members.

7. A seal assembly according to claim 1, wherein the band further includes engagement formations for engagement with the sealing member.

8. A seal assembly according to claim 7, wherein the band includes recesses or apertures for engagement with protrusions on the sealing member.

9. A seal assembly according to claim 1, wherein the band comprises surface formations in an interface region between the elastomeric component and the band.

10. A seal assembly according to claim 9, wherein the surface formations comprise projections and/or recesses in the surface of the band, and/or one or more perforations in the band.

11. A seal assembly according to claim 10, wherein a portion of the elastomeric component is in interlocking engagement with a portion of the band.

12. A seal assembly according to claim 1, including a chemical bonding agent between a surface of the band and a surface of the elastomeric component.

\* \* \* \* \*